United States Patent Office 3,426,031
Patented Feb. 4, 1969

3,426,031
3,5,6 - TRICHLORO - 4 - [3 - ($\alpha,\alpha,\alpha,\alpha',\alpha',\alpha'$-HEXAFLUORO - 3,5 - XYLYL)UREIDO] PICOLINIC ACID AND THE CORRESPONDING AMIDE DERIVATIVE
Bryant C. Fischback, Walnut Creek, Calif., assignor to The Dow Chemical Company, Midland, Mich., a corporation of Delaware
No Drawing. Filed Jan. 19, 1967, Ser. No. 610,236
U.S. Cl. 260—295                    2 Claims
Int. Cl. C07d 31/44; A61k 27/00

ABSTRACT OF THE DISCLOSURE

The new compounds, 3,5,6-trichloro-4-[3-($\alpha,\alpha,\alpha,\alpha',\alpha',\alpha'$-hexafluoro-3,5-xylyl)ureido] picolinic acid and 3,5,6-trichloro - 4 - [3 - ($\alpha,\alpha,\alpha,\alpha',\alpha',\alpha'$-hexafluoro - 3,5 - xylyl)ureido] picolinamide which are useful as hypocholesteremic agents, and methods for their preparation.

---

The present invention is concerned with hexafluoroxylyurea compounds and is particularly directed to 3,5,6-trichloro - 4 - [3 - ($\alpha,\alpha,\alpha,\alpha',\alpha',\alpha'$-hexafluoro-3,5-xylyl)ureido] picolinic acid and 3,5,6-trichloro-4-[3-($\alpha,\alpha,\alpha,\alpha',\alpha',\alpha'$-hexafluoro-3,5-xylyl)ureido] picolinamide which correspond to the formula:

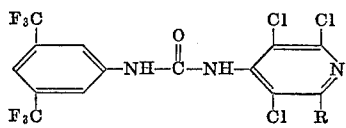

In the present specification and claims, R represents a carboxyl group or a carboxamide group. The novel compounds, which will be referred to hereinafter as hexafluoroxylylurea compounds, are crystalline solids which are soluble in a variety of organic solvents such as methanol, ethanol, dimethyl formamide and dimethyl sulfoxide, and which are only slightly soluble in water. The novel compounds are useful as hypochlolesteremic agents. The compounds of the invention have the effect of lowering serum cholesterol in animals upon administration to animals, and have little or no pharmacological effects in other areas at dosage levels consistent with good hypocholesteremic activity.

The hexafluoroxylyurea compounds of the invention are prepared by the base-catalyzed reaction of $\alpha,\alpha,\alpha,\alpha',\alpha',\alpha'$-hexafluoro-3,5-xylyl isocyanate with 4-amino-3,5,6-trichloropicolinic acid or 4-amino-3,5,6-trichloropicolinamide. The reaction is preferably carried out in an inert organic solvent such as dimethyl sulfoxide, dimethyl formamide or tetramethylene sulfone as a reaction medium. The reaction proceeds when the reactants, the basic catalyst and the reaction medium are contacted and mixed, and proceeds at temperatures from about 20° C. to the boiling temperature of the reaction mixture. The reaction is preferably carried out at temperatures from about 80° C. to slightly below the boiling temperature of the mixture, and under reflux. The exact proportions of the reactants to be employed are not critical, some of the desired product being obtained when combining the reactants in any proportions. However, the reaction consumes the reactants in equimolar proportions and the use of the reactants in such proportions is preferred. A minor proportion of the basic catalyst is employed. Representative and suitable catalysts include tertiary amines such as pyridine, trimethylamine, triethylamine and triethylene diamine. The hexafluoroxylylurea product can be separated from the reaction mixture by dilution with water to precipitate the product or by evaporation in vacuo to remove the organic solvent. The product can be purified by conventional methods such as recrystallization.

In the preparation of the compounds of the invention, 4-amino-3,5,6-trichloropicolinic acid or 4-amino-3,5,6-trichloropicolinamide is dissolved in the inert organic solvent and a minor proportion of the catalyst, preferably triethylamine or triethylene diamine, is added. The $\alpha,\alpha,\alpha,\alpha',\alpha',\alpha'$-hexafluoro-3,5-xylyl isocyanate is then added slowly to the solution and the resulting mixture is held for a period of time at a temperature within the reaction temperature range. The reaction period can vary depending upon the reaction temperature employed; from about three weeks at room temperature to about one day at the boiling temperature of the mixture. During the reaction period, care is taken to exclude moisture from the reaction mixture. In a convenient procedure, the hexafluoroxylylurea product is separated from the reaction mixture by diluting the mixture with water, whereupon the product precipitates and can be collected by conventional methods as filtration. Alternatively, the reaction mixture can be evaporated in vacuo to leave the product as a residue. The hexafluoroxylylurea product can be purified by recrystallization by dissolving the product in ethanol and adding water to precipitate the product.

In a representative operation, 4-amino-3,5,6-trichloropicolinic acid (5 grams; 0.021 mole) was dissolved in about 150 milliliters of anhydrous dimethyl sulfoxide. One milliliter of triethylamine was then added, after which $\alpha,\alpha,\alpha,\alpha',\alpha',\alpha'$-hexafluoro-3,5-xylyl isocyanate (5.5 grams; 0.021 mole) was added dropwise to the mixture. The mixture was then heated to just below its boiling temperature under reflux for about 21 hours, with careful exclusion of moisture. The mixture was poured into ice water and a brown precipitate formed. The mixture was filtered and the precipitate collected as a filter cake. The 3,5,6-trichloro-4-[3-($\alpha,\alpha,\alpha,\alpha',\alpha',\alpha'$-hexafluoro-3,5-xylyl)ureido] picolinic acid product was recrystallized from ethanol using a small amount of water to precipitate the product. The product was found to melt at 195° C. and was found by analysis to have hydrogen, nitrogen and chlorine contents of 1.19, 9.04 and 21.72 percent, respectively, as compared with the theoretical contents of 1.22, 8.46 and 21.41 percent, respectively, calculated for the named structure. The structure of the 3,5,6-trichloro-4-[3-($\alpha,\alpha,\alpha,\alpha'$, $\alpha',\alpha'$-hexafluoro-3,5-xylyl)ureido] picolinic acid product was confirmed by infrared spectroscopy.

In substantially the same procedure, 3,5,6-trichloro-4-[3-($\alpha,\alpha,\alpha,\alpha',\alpha',\alpha'$-hexafluoro-3,5-xylyl)ureido] picolinamide, having a molecular weight of 483.6, is prepared by mixing together equimolar proportions of $\alpha,\alpha,\alpha,\alpha',\alpha',\alpha'$-hexafluoro-3,5-xylyl isocyanate and 4-amino-3,5,6-trichloropicolinamide with a minor amount of triethylamine in anhydrous dimethyl sulfoxide.

The novel compounds are useful as hypocholesteremic agents. For such uses, the compounds are adapted to be incorporated into a suitable carrier such as, for example, a pharmaceutical carrier, beverage or foodstuff for administration to animals. The compounds are adapted to be formulated as tablets or powders, or as emulsions, solutions or suspensions with suitable known pharmaceutical excipients. The compounds can also be incorporated in a nutritive preparation or foodstuff for administration in the diet.

In representative operations, 3,5,6-trichloro-4-[3-($\alpha,\alpha$, $\alpha,\alpha',\alpha',\alpha'$-hexafluoro-3,5-xylyl)ureido] picolinic acid was intimately mixed with balanced rodent feed to provide a nutritive composition containing 0.06 percent 3,5,6-trichloro-4-[3 - ($\alpha,\alpha,\alpha,\alpha',\alpha',\alpha'$-hexafluoro-3,5-xylyl)ureido] picolinic acid as the sole hypocholesteremic agent therein. A group of six mice was maintained on a diet of the composition containing 0.06 percent 3,5,6-trichloro-4-[3-($\alpha,\alpha,\alpha,\alpha',\alpha',\alpha'$ - hexafluoro-3,5-xylyl)ureido] picolinic acid for a period of seven days. A similar group of mice was maintained for seven days on a similar diet which contained no hexafluoroxylylurea compound to serve as a check. At the end of the test period, the mice were sacrificed and exsanguinated. Total serum cholesterol levels were measured using the ferric chloride-acetic acid reagent described by Henly in The Analyst, 82, 286 (1957) and comparing the percent transmission of light in a spectrophotometer at a wave length of 560 millimicrons with that for mixtures containing known amounts of cholesterol. The average serum cholesterol level for the mice administered 3,5,6-trichloro-4-[3-($\alpha,\alpha,\alpha,\alpha',\alpha',\alpha'$-hexafluoro-3,5-xylyl)ureido]picolinic acid was found to be about 27 percent lower than that for the check group.

The $\alpha,\alpha,\alpha,\alpha',\alpha',\alpha'$-hexafluoro-3,5-xylyl isocyanate compound employed as a starting material herein can be prepared by known procedures. For example, 700 grams of $\alpha,\alpha,\alpha,\alpha',\alpha',\alpha'$-hexafluoro-3,5-xylidene were dissolved in 7 liters of benzene and the solution was heated to the boiling point to azeotropically remove water. The solution was cooled and excess hydrogen chloride gas was passed through the solution for about 80 minutes. The mixture was then heated to the boiling point under reflux and excess phosgene was passed through the mixture for about seven hours. The mixture was cooled and filtered, the filtrate was distilled and the $\alpha,\alpha,\alpha,\alpha',\alpha',\alpha'$-hexafluoro-3,5-xylyl isocyanate product was collected as a fraction boiling at 78° C. under a pressure of 25 millimeters of mercury.

I claim:
1. A member of the group consisting of 3,5,6-trichloro-4-[3-($\alpha,\alpha,\alpha,\alpha',\alpha',\alpha'$-hexafluoro-3,5-xylyl)ureido] picolinic acid and 3,5,6-trichloro-4-[3-($\alpha,\alpha,\alpha,\alpha',\alpha',\alpha'$-hexafluoro-3,5-xylyl)ureido] picolinamide.
2. 3,5,6-trichloro-4-[3 - ($\alpha,\alpha,\alpha,\alpha',\alpha',\alpha'$-hexafluoro-3,5-xylyl)ureido] picolinic acid.

References Cited
UNITED STATES PATENTS 3,293,257  12/1966  Woods et al. _____ 260—295
3,330,641  7/1967   Woods et al. ____ 260—295 XR HENRY R. JILES, *Primary Examiner.*

ALAN L. ROTMAN, *Assistant Examiner.*

U.S. Cl. X.R.

424—263